JOHN M. DAVIDSON, OF PULASKI, PENNSYLVANIA.

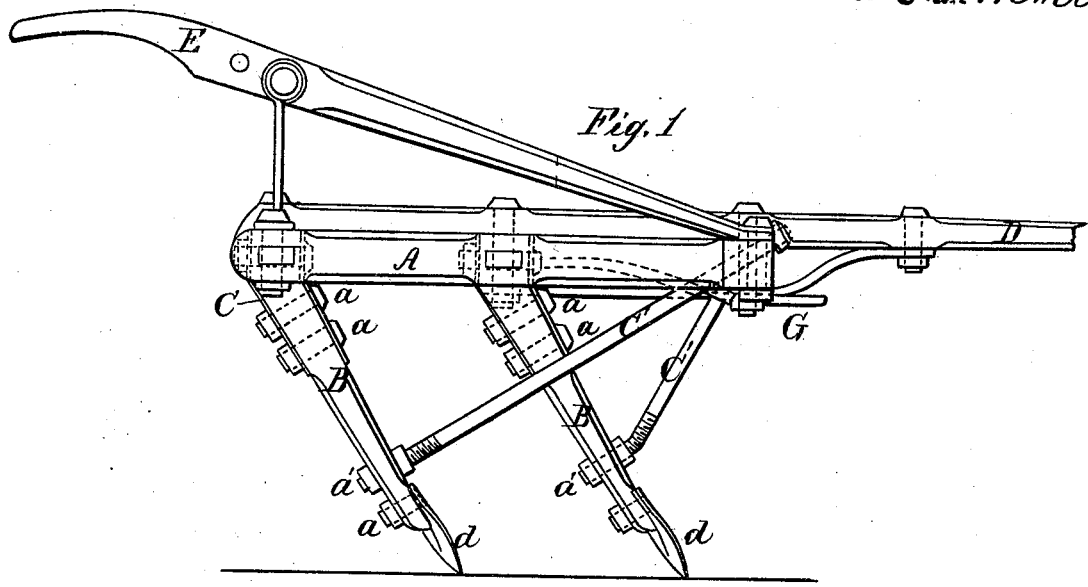
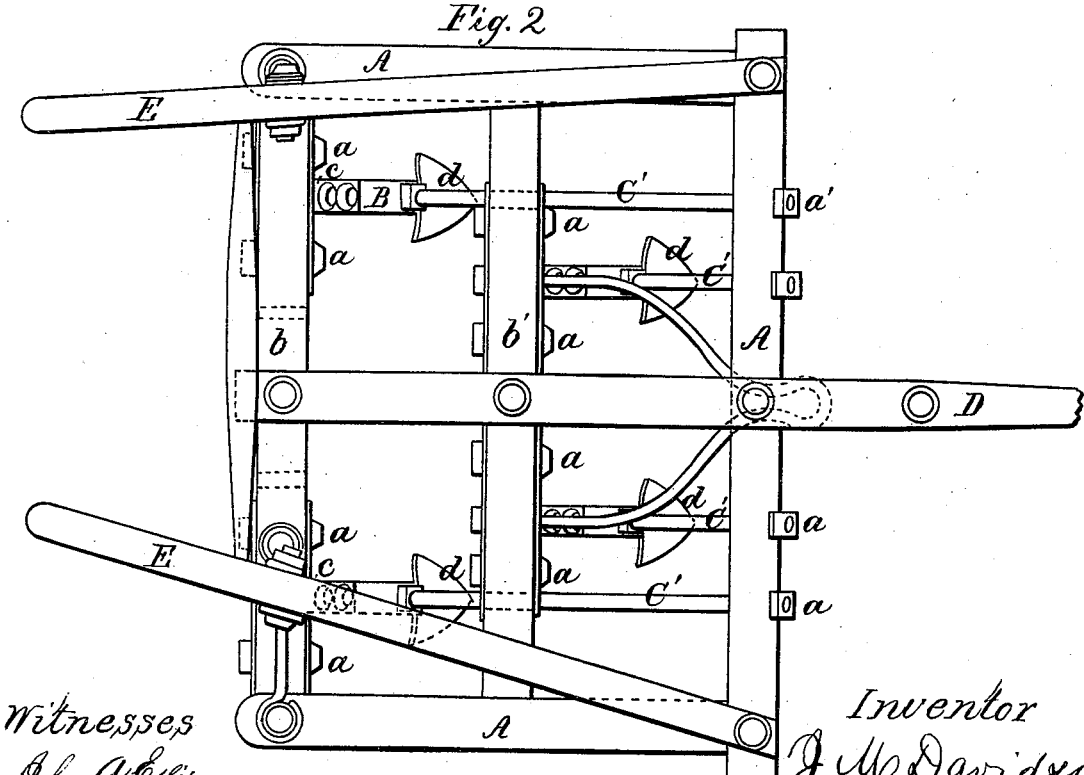

Letters Patent No. 87,914, dated March 16, 1869.

IMPROVEMENT IN POTATO AND CORN-CULTIVATOR.

The Schedule referred to in these Letters Patent and making part of the same.

*To all whom it may concern:*

Be it known that I, JOHN M. DAVIDSON, of Pulaski, in the county of Lawrence, and State of Pennsylvania, have invented certain new and useful Improvements in Potato and Corn-Cultivators; and I do hereby declare that the following is a full, clear, and exact description thereof, reference being had to the accompanying drawings, and to the letters of reference marked thereon, which form a part of this specification, and in which—

Figure 1 represents a side view, and

Figure 2, a plan view of my corn and potato-cultivator.

Similar letters indicate like parts in both figures.

My invention relates to improvements in corn and potato-cultivators; and, to this end, It consists in the employment of a frame, to which are attached, in an angular position, legs, provided with shovels, whereby both sides of the rows may be operated upon at the same time.

To enable others skilled in the art to which my invention appertains, to make and use the same, I will now describe its construction and operation.

In the accompanying drawings—

A represents an ordinary frame.

To the lower sides of the bars $b\ b'$ of the frame are secured legs B B B B.

These legs form an acute angle with the said bars, and are made adjustable thereto by metal plates C C.

These plates are made in a T-shape, the upper part of the T being attached to the bars by bolts and nuts $a\ a$, so that the legs may be moved in or out, to suit the width of the rows.

$C'\ C'$ represent rods, passing through the forward part of the frame, and then through the lower part of the legs, and secured by the screw-nuts $a'\ a'$.

$d\ d$ are shovels, attached to the lower part of the legs, as seen in the drawings.

It will be observed, that the legs, attached to the rear bar, $b$, are placed near its end, while those on the middle bar, $b'$, are placed near its centre.

This arrangement is to allow both sides of the rows to be operated upon at the same time.

By my arrangement, three rows can be worked at the same time, the middle row passing between the two horses.

D represents the tongue;

E, the handles; and

G, the drag-bar.

Having thus described my invention,

What I claim as new, and desire to secure by Letters Patent, is—

Frame A, bars $b\ b'$, plates C C, rods $C'\ C'$, adjustable legs B B, and drag-bar G, all constructed, combined, and arranged to operate, as herein set forth.

In testimony that I claim the foregoing as my own, I affix my signature, in presence of two witnesses.

JOHN M. DAVIDSON.

Witnesses:
 JAMES F. JACKSON,
 JOHN McCLUSKEY.